LAURENCE E. FOGARTY
INVENTOR

BY
Watson, Johnson, Leavenworth & Blair
ATTORNEYS

Oct. 13, 1964  L. E. FOGARTY  3,153,143
FLIGHT PERFORMANCE COMPUTER
Filed Jan. 7, 1954  2 Sheets-Sheet 2
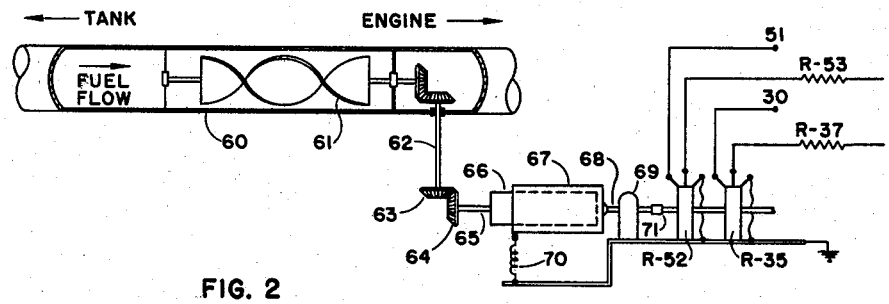
FIG. 2
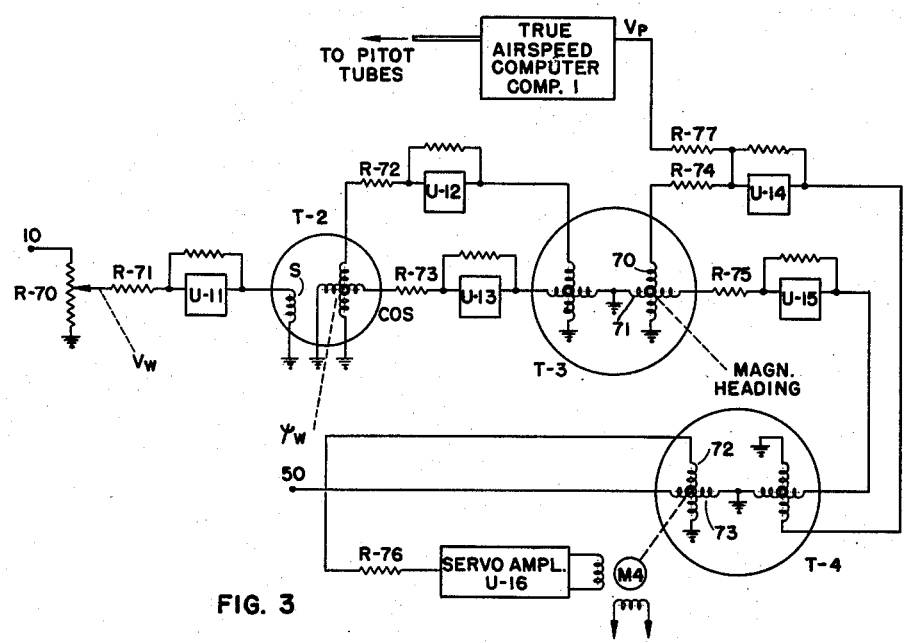
FIG. 3
FIG. 4
LAURENCE E. FOGARTY
INVENTOR
BY Watson Johnson Leavenworth + Blair
ATTORNEYS

United States Patent Office 3,153,143
Patented Oct. 13, 1964

3,153,143
FLIGHT PERFORMANCE COMPUTER
Laurence E. Fogarty, Binghamton, N.Y., assignor to General Precision Inc., a corporation of Delaware
Filed Jan. 7, 1954, Ser. No. 402,787
13 Claims. (Cl. 235—184)

This invention relates to a flight performance computer and is particularly applicable to calculate the performance of modern aircraft.

Due to the high speed of modern aircraft, the high rate of fuel consumption, and the complexity of the duties of crew members, an improved method of predicting range and endurance during flight is highly desirable. Heretofore it has been the practice to supply graphic performance charts with which the pilot or other crew member of the aircraft has been expected to estimate range and endurance. In addition to relieving the crew members of this task, this invention calculates "specific range" or fuel consumption, range, and endurance continuously and directly. Because the manufacturer's performance charts heretofore furnished to a pilot or flight engineer are necessarily based on average flight conditions, the calculations made upon the basis of such charts may be grievously in error due to such factors, as battle damage to the aircraft, icing conditions, and various other unpredictable phenomena. My invention computes flight performance on the basis of actual flight conditions, and hence gives the pilot a more accurate indication of the fuel consumption, the range, and the maximum time of remaining flight. Since calculations made by means of manufacturer's charts require considerable time, and because modern aircraft may travel substantial distances during the time the pilot is calculating, the need for an instantaneous indication of the aforementioned flight information has been urgent.

Computers are known which attempt to furnish an indication of endurance, or remaining flight time, providing the pilot flies at such a rate so as to use fuel continuously at the same rate. These computers, however, fail to take into account the fact that airplane weight decreases as fuel is expended. As airplane weight decreases, it is apparent htat a longer distance may be flown per pound of fuel expended. In very many modern aircraft, airplane final or empty weight is as little as one half of the weight of the airplane fully-loaded with fuel. In such aircraft, the range and endurance are markedly affected by the decrease in weight as fuel is expended. In addition, the dropping of bombs, or jettisoning of cargo may greatly affect airplane weight, necessitating consideration of this factor in any realistic range and endurance computations.

It is therefore a primary object of this invention to provide improved flight performance computation method and apparatus.

It is an additional object of the invention to provide an aircraft flight performance computation method and computing apparatus in which the changing weight due to expenditure of aircraft fuel is utilized in obtaining accurate flight indications.

It is another object of the invention to provide aircraft flight computation apparatus usable for computations based on a plurality of common flight cruise plans.

It is a further object of the invention to provide aircraft flight computation apparatus in which change in aircraft weight due to release of bombs or other cargo is utilized in obtaining accurate flight indications.

It is an additional object of the invention to provide flight computation apparatus in which aircraft fuel consumption, aircraft range and aircraft endurance are indicated continuously and directly.

It is another object of the invention to provide flight computer apparatus from which the relative performance of the aircraft under a plurality of possible flight cruise plans may be readily predicted.

It is a further object of the invention to provide aircraft flight performance computer apparatus which will furnish indications of aircraft landing weight at a future destination and time of flight to a future destination.

Other objects will appear as the description proceeds.

The invention accordingly comprises the several steps and the relation of one or more of such steps with respect to each of the others, and the apparatus embodying features of construction, combination of elements and arrangement of parts which are adapted to effect such steps, all as exemplified in the following detailed disclosure, and the scope of the invention will be indicated in the claims.

For a fuller understanding of the nature and objects of the invention, reference should be had to the following detailed description taken in connection with the accompanying drawings, in which:

FIG. 2 is a schematic diagram of a fuel flow rate determining apparatus which may be utilized to provide a necessary input quantity to the apparatus shown in FIG. 1;

FIG. 3 is a schematic diagram of ground speed determining apparatus which may be used to provide a necessary input to the apparatus of FIG. 1;

FIG. 4 is an electrical schematic diagram showing how a potentiometer may be connected to the apparatus of FIG. 1 if ground speed is determined by use of means other than the apparatus of FIG. 3. In all of the figures, like numerals refer to like parts.

Figure 1:
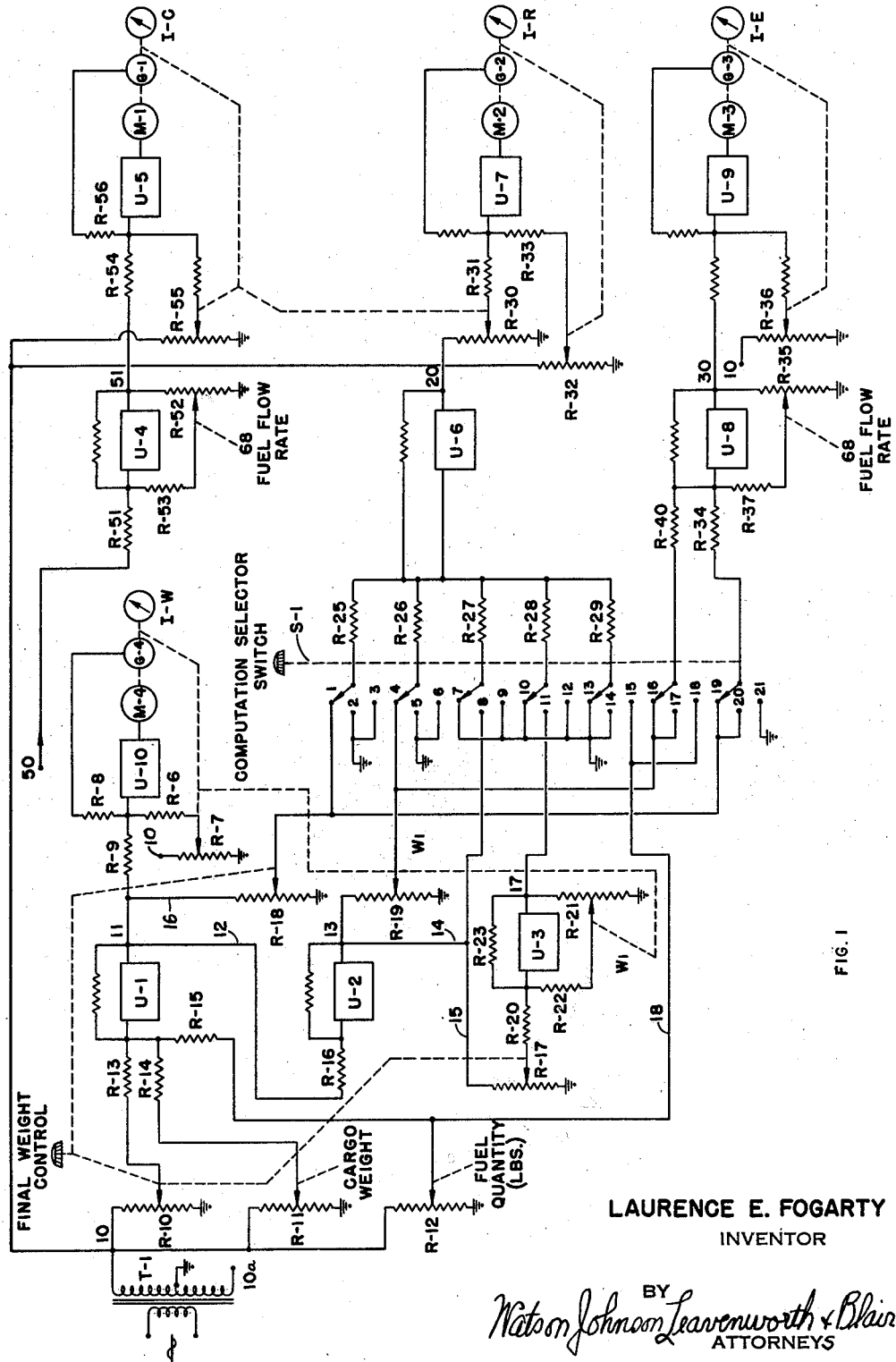
FIG. 1 is an electrical schematic diagram of a preferred embodiment of the apparatus of my invention, in which well-known computer components are shown symbolically for sake of clarity.

The distance or range in which any body will move in a given time may be expressed by the formula $$R = Vt$$

where R equals range in miles; V equals speed or velocity in miles per hour; and $t$ equals time in hours. The distance, therefore, in which the body will move in a small increment of time ($dt$) may be expressed as $$dR = V dt \qquad (1)$$

When weight W is a function of time, $dt$ may be expressed as:

$$dt = \frac{1}{\frac{dW}{dt}} dW$$

This expression may be substituted in Formula 1 giving:

$$dR = \frac{V dW}{\frac{dW}{dt}} \qquad (2)$$

The quantity $$\left(\frac{dW}{dt}\right)$$

is taken to be the time rate of change of aircraft total weight, and assuming no other weight changes, such as bomb or cargo drops take place, the quantity will be the negative of fuel flow rate, $W_f$, which may be expressed in pounds. Making the aforementioned assumption, Formula 2 may be re-written as:

$$dR = \frac{-V dW}{\frac{dW_f}{dt}} \qquad (3)$$

Fuel flow rate may be seen to affect aircraft weight

"negatively" since increasing fuel flow decreases aircraft weight.

During straight and level unaccelerated flight, i.e., normal cruising, aircraft lift (L) and weight (W) are equal, and aircraft thrust (T) and drag (D) are equal. Formula 3 may then be re-written as $$dR = \frac{-V}{\frac{dW_f}{dt}} \frac{T}{D} \frac{L}{W} dW \tag{4}$$

Since thrust (T) divided by rate of fuel flow $$\left(\frac{dW_f}{(dt)}\right)$$

equals the reciprocal of specific fuel consumption C, Formula 4 may be re-written as:

$$dR = \frac{-V}{C} \frac{L}{D} \frac{dW}{W} \tag{5}$$

A common cruise flight plan for modern high-speed aircraft is one at constant velocity. During a cruise flight plan based on a constant velocity, the altitude of the flight commonly is increased as aircraft weight decreases, to maintain a constant lift coefficient and hence a constant ratio between lift (L) and drag (D).

The specific fuel consumption (C) may be taken to be nearly constant for constant velocity cruise conditions, so that the product $$V \frac{1}{C} \frac{L}{D}$$

may be considered constant for this type of cruise.

Integration of Equation 5 between limits of aircraft instantaneous weight $W_1$ and aircraft final weight $W_2$ then gives:

$$\text{Range } R_{1-2} = -V \frac{1}{C} \frac{L}{D} \int_{W_1}^{W_2} \frac{dW}{W} \tag{6}$$

$$R_{1-2} = +V \frac{1}{C} \frac{L}{D} \log_\epsilon \left(\frac{W_1}{W_2}\right) \tag{7}$$

Since $$\frac{1}{C} \text{ equals } \frac{T}{\frac{dW_f}{dt}}$$

lift (L) equals weight (W), and thrust (T) equals drag (D), $$R_{1-2} = \frac{+VW_1}{\frac{dW_f}{dt}} \log_\epsilon \frac{W_1}{W_2} \tag{8}$$

In expression (8) the $$\frac{V}{\frac{dW_f}{dt}}$$

term may be seen to define "specific range," or "miles per pound of fuel." The $$W_1 \log_\epsilon \frac{W_1}{W_2}$$

terms define instantaneous total aircraft weight $W_1$ modified by a dimensionless factor which expresses the percentage of instantaneous total aircraft weight composed of fuel, with consideration being given to the fact that aircraft specific range will increase during the course of constant speed flight due to consumption of fuel. For convenience, the $$W_1 \log_\epsilon \frac{W_1}{W_2}$$

term may be designated as "effective fuel weight" for a constant speed flight.

Another widely-used cruise flight plan for modern high-speed aircraft is one at constant altitude. Operating under such a flight plan, the pilot decreases his speed as aircraft weight decreases, maintaining constant the ratio between lift (L) and drag (D). The coefficient of lift in any aerodynamic body may be expressed as:

$$C_L \frac{L}{\frac{1}{2}\rho V^2 S} \tag{9}$$

where W equals body weight in pounds, $\rho$ equals the mass density of the air in slugs per cubic foot, velocity (V) is expressed in feet per second, and S=wing area in square feet. During level flight lift L may be seen to be equal to weight W.

Solving for V in Equation 9 and substituting instantaneous weight W for lift L the following is obtained:

$$V = \sqrt{2W/\rho S C_L} \tag{10}$$

Substituting this expression for velocity in Equation 5 and writing $$\frac{C_L}{C_D} \text{ for } \frac{L}{D} \text{ and } C_D \text{ equal to } \frac{D}{\frac{1}{2}\rho V^2 S}$$

$$dR = \frac{-1}{C} \sqrt{\frac{2W}{\rho S C_L}} \frac{C_L}{C_D} \frac{dW}{W} \tag{11}$$

Combining $C_L$ and W term, the following expression is obtained:

$$dR = \frac{-1}{C} \sqrt{\frac{2}{\rho S}} \frac{\sqrt{C_L}}{C_D} \frac{dW}{\sqrt{W}} \tag{12}$$

Assuming the product $$\sqrt{\frac{C_L}{C_D}}$$

to be a constant because the ratio of lift (L) to drag (D) is to be maintained constant in level flight, assuming $$\frac{1}{C}$$

to be a constant because engine efficiency will be essentially constant over the speed range, and assuming $\rho$ to be constant at constant altitude, Equation 12 may be integrated to obtain:

$$R_{1-2} = \sqrt{\frac{2}{\rho S}} \frac{1}{C} \sqrt{\frac{C_L}{C_D}} [2w_1^{1/2} - 2w_2^{1/2}] \tag{13}$$

Substituting $$\frac{L}{\frac{1}{2}\rho V^2 S} \text{ for } C_L \text{ and } \frac{D}{\frac{1}{2}\rho V^2 S} \text{ for } C_D$$

and recognizing $$\frac{T}{D} \text{ and } \frac{L}{W}$$

each as unity during steady-state flight, $$R_{1-2} = \sqrt{\frac{2}{\rho S}} \frac{T}{\frac{dW_f}{dt}} \sqrt{\frac{L}{D}} \frac{\frac{\rho V^2 S}{2}}{\sqrt{\frac{\rho V^2 S}{2}}} \sqrt{W_1} \left[2 - 2\left(\frac{W_2}{W_1}\right)^{1/2}\right] \tag{14}$$

Since $L = W$, $\sqrt{L} \times \sqrt{W_1} = W_1$ and because $$\frac{T}{D} = 1$$

expression (14) reduces to:

$$R_{1-2} = \frac{VW_1}{\frac{dW_f}{dt}} [2 - 2\sqrt{W_2/W_1}] \tag{15}$$

In expression (15) the $$V_1 \Big/ \frac{dW_f}{dt}$$

term may be seen to define "specific range" (miles per pound of fuel) and the $$\left[2-2\sqrt{\frac{W_2}{W_1}}\right]$$

term to define "effective fuel weight" (total instantaneous aircraft weight modified by the dimensionless percentage in brackets), which expresses the percentage of total instantaneous aircraft weight composed of fuel, with consideration being given to the fact that aircraft specific range will increase during the course of constant altitude flight due to consumption of fuel.

Airplane endurance is considered to be the time of flight remaining until all fuel will be expended if a given flight plan is continued. In any moving body, the time (E) required to move a given distance (R), is dependent upon velocity (V) as defined by the following expression:

$$E = \frac{R}{V} \quad (16)$$

Hence $$dE = \frac{dR}{V} \quad (17)$$

If $$\frac{1}{C} \text{ and } \frac{L}{D}$$

are constants, as assumed above, Equation 17 may be written as:

$$dE = \frac{1}{C}\frac{L}{D}\frac{dW}{W} \quad (18)$$

Integrating Equation 18, the following is obtained:

$$E = \left[\frac{W_1}{\frac{dW_f}{dt}}\right] \log_\epsilon \frac{W_1}{W_2} \quad (19)$$

Providing that the product $$\frac{1}{C}\frac{L}{D}$$

is maintained constant, Equation 19 may be utilized in computations of endurance for either a constant altitude flight plan or a constant velocity flight plan. It will be seen that endurance E equals the "effective fuel weight" divided by the fuel flow rate. The computation of "effective fuel weights" for the various flight plans from quantities which are measurable during flight is a salient feature of my invention.

If the weight of fuel carried becomes quite small compared to airplane final weight, so that the square and higher terms of the quantity $$\left(\frac{W_f}{W_2}\right)$$

become small (for example, less than one percent), the right-hand sides of Equations 15 and 8 may be expanded by means of binomial expansion to obtain:

$$R_{1-2} = \frac{VW_f}{\frac{dW_f}{dt}} \quad (20)$$

It will be quite apparent that this formula represents range as computed without consideration given to the change in airplane weight due to expenditure of fuel. The operation of my invention to provide indications of specific range (miles per lb.), range (miles) and endurance (minutes or hours) under the previously-described flight plans will now be explained.

Referring to FIG. 1, there is shown schematically a preferred embodiment of my invention, in which well-known computer components are illustrated in block diagram form for sake of clarity.

To input terminal 50 an input voltage proportional to aircraft ground speed should be connected. Various methods of deriving this voltage are explained in connection with FIGURES 3 and 4. This voltage commensurate with ground speed, or airspeed corrected for wind drift, is applied through summing resistor R–51 to feedback summing amplifier U–4. A portion of the output voltage of amplifier U–4 is selected by potentiometer R–52 and applied to the input circuit of summing amplifier U–4 through summing resistor R–53. The wiper arm of potentiometer R–52 is positioned by the fuel flow system of the aircraft, so that the position of the wiper arm varies in accordance with the rate of fuel flow from the tanks to the engines, as will be explained in connection with FIGURE 2. As will be apparent to those skilled in the art, the input quantity represented by the voltage applied through resistor R–51 will be divided by the quantity represented by position of the wiper arm of potentiometer R–52, so that the output voltage appearing at terminal 51 will be commensurate with $$\frac{V}{-\frac{dW_f}{dt}}$$

This voltage is applied through resistor R–54 to servoamplifier U–5, a conventional servoamplifier. Servoamplifier U–5 drives servo motor M–1 to a position corresponding to the quantity, "specific range." It will be apparent that if ground speed (V) is scaled in miles per hour, and if fuel flow $$\left(\frac{dW_f}{dt}\right)$$

is scaled in pounds per hour, that the quotient represented by the position of servomotor M–1 will be specific range in miles per pound. Specific range indicator I–C is mechanically connected through gearing to the shaft of servomotor M–1. Also connected to the shaft of servomotor M–1 is the wiper arm of follow-up potentiometer R–55, and tachometer generator G–1. Tachometer generator G–1 is a conventional rate feedback or damping generator provided to minimize hunting of servomotor M–1. The output voltage of rate generator G–1 is fed to the input circuit of servoamplifier U–5 through summing resistor R–56. The wiper arm of potentiometer R–55 is driven upwardly as the quantity "miles per pound" increases. Thus it will be seen that the apparatus of FIG. 2 which has been described thus far comprises means for deriving a computer quantity commensurate with instantaneous aircraft "specific range."

Terminal 10 is shown connected to one output terminal of transformer T–1, the primary winding of which may be supplied from the aircraft alternating current power supply. The center-top of the secondary winding T–1 is connected to ground as shown. The voltage appearing at terminal 10 is applied to excite the windings of potentiometers R–10, R–11, and R–12.

The wiper arm of potentiometer R–10 may be adjusted by the aircraft crew member operating the computer to a position commensurate with aircraft weight when all fuel, or a given percentage of all fuel, has been expanded and no bombs or cargo are aboard. The wiper arm of potentiometer R–11 is adjusted by the operator to a position commensurate with cargo and bombs loaded aboard the aircraft. The wiper arm of potentiometer R–12 is connected to the aircraft fuel quantity indicating system, so that the position of the wiper arm corresponds to the amount of fuel present in the aircraft fuel tanks. If a plurality of fuel tanks are utilized on the aircraft, it will be apparent that additional potentiometers may be connected in the same manner as potentiometer R–12. The wiper arm of potentiometer R–12 may be positioned in response to fuel quantity in the manner illustrated in Patent No. 2,656,977, granted on Oct. 27, 1953, to Kimball C. Cummings, as well as by numerous other means.

It will be apparent that the voltages appearing upon the wiper arms of potentiometers R–10, R–11 and R–12 represents various components of aircraft weight, and that their sum represents instantaneous gross weight of the aircraft. As bombs are dropped, or other cargo is unloaded, the computer operator should re-adjust potentiometer R–11 to a position representative of remaining cargo weight. It will be apparent that switch contacts may be provided on a bomb release intervalometer which may disconnect and then ground the wiper arm terminal of potentiometer R–11 when bombs are dropped, to remove or decrease the cargo weight signal. Voltages representing additional loads contributing to cargo weight may be furnished by provision of additional potentiometers similar to potentiometer R–11, and such voltages may be fed into summing amplifier U–1 through additional summing resistors connected similarly to summing resistor R–14. These voltages are applied through summing resistors R–13, R–14 and R–15 to summing amplifier U–1, shown in block diagram form. Summing amplifiers utilized herein are conventional feedback summing amplifiers, and may comprise, for example, the type described in Patent No. 2,401,779, granted on June 11, 1946, to Karl Swartzel. The output voltage at terminal 11 will be commensurate with the sum of the input voltages, and hence will be proportional to the total instantaneous aircraft weight. This voltage is applied through resistor R–9 and servoamplifier U–10 to position servomotor M–4 and weight indicator I–W in accordance with instantaneous weight. Thus it will be seen that a computer quantity commensurate with total aircraft instantaneous weight is derived as a voltage at terminal 11 by means shown as comprising potentiometers R–10, R–11, R–12 and their actuating apparatus and summing amplifier U–1, and that the voltage is converted to a shaft position computer quantity in conventional analog computer fashion by means of servo M–4.

The output voltage at terminal 11 is also applied through conductor 12 and resistor R–16 to feedback amplifier U–2, which may be of a type similar to amplifier U–1. In amplifier U–2, however, the feedback impedance is made approximately twice the amount of the input impedance. The output voltage appearing at terminal 13 will then be twice the magnitude of the voltage at terminal 11, although reversed in phase 180 degrees. This voltage is applied through conductors 14 and 15 to excite the winding of potentiometer R–17. The wiper arm of potentiometer R–17 is connected to be positioned by the operator in accordance with aircraft final or empty weight, in the same manner as potentiometer R–10. The voltage appearing on the wiper arm of potentiometer R–17 varies as the square root of the motion of its wiper arm, it being provided with a square root function winding.

The voltage commensurate with instantaneous aircraft weight $W_1$ at terminal 11 is also applied through conductor 16 to excite potentiometer R–18, which has a natural logarithmic function built into its winding. The wiper arm of potentiometer R–18 is set to aircraft final or empty weight in the same manner as potentiometer R–10. The voltage appearing on the wiper arm of potentiometer R–18 and contact 1 of selector switch S–1 will then be proportional to instantaneous weight multiplied by the natural logarithm of aircraft empty weight, or: $-W_1 \log_e W_2$.

The output voltage at terminal 13 is applied to excite potentiometer R–19, which is also a natural logarithmic function potentiometer. The wiper arm of potentiometer R–19 is positioned by the instantaneous weight servomotor M–4. Therefore, the voltage appearing on the wiper arm of potentiometer R–19 and terminal 4 of selector switch S–1 will be proportional to aircraft instantaneous weight multiplied by the natural logarithm of aircraft instantaneous weight, or equal to: $+2W_1 \log_e W_1$.

This latter quantity has a different sign than the output on terminal 1 of selector switch S–1 because of the 180° phase reversal occurring in amplifier U–2. The value of resistor R–26 is selected with respect to the value of R–25 so that the voltage applied to summing amplifier U–6 through R–26 is proportionally halved.

The voltage appearing on the wiper arm of potentiometer R–17 (commensurate with twice the aircraft instantaneous weight multiplied by the square root of aircraft final weight) is applied through resistor R–20 to the input circuit of summing amplifier U–3. The output voltage at terminal 17 of summing amplifier U–3 is used to excite potentiometer R–21, a square root function potentiometer whose wiper arm is positioned by the instantaneous weight servo M–4 in the same manner as potentiometer R–19. The voltage on the wiper arm of potentiometer R–21 is applied through summing resistor R–22 to the input of summing amplifier U–3. It will be apparent to those skilled in the art that the output potential from amplifier U–3 will be commensurate with the ratio between the input voltage applied via resistor R–20 and the movement of the wiper arm of potentiometer R–21. The output voltage appearing at terminal 17 of feedback summing amplifier U–3 hence will be proportional to:

$$-2W_1 \sqrt{\frac{W_2}{W_1}}$$

The voltage appearing on the wiper arm of potentiometer R–12 is also routed through conductor 18 to terminal 15 of selector switch S–1. As will become apparent as the description proceeds, selector switch S–1 may be set by the pilot or computer operator to different positions for different flight plans, and different positions of switch S–1 apply potentials commensurate with different functions of $W_1$ and $W_2$ to signal combining means shown as comprising conventional feedback amplifiers U–6 and U–8.

Assuming the pilot wishes to conduct a flight plan based on maintaining constant velocity, he will set computation selector switch S–1 to its upper position, as shown in FIG. 1. This will apply a voltage proportional to the quantity $(-W_1 \log_e W_2)$ to summing amplifier U–6 through contact 1 of switch S–1 and summing resistor R–25. This will also apply a voltage proportional to the quantity $+W_1 \log_e W_1$ through contact 4 of switch S–1 and resistor R–26. Summing resistors R–27, R–28 and R–29 will be grounded through contacts 7, 10, and 13, respectively, of selector switch S–1. Feedback summing amplifier U–6 will add the two applied voltages, and hence deliver an output at terminal 20 proportional to the quantity:

$$-W_1 \log_e W_1 + W_1 \log_e W_2$$

which equals:

$$+W_1 \log_e \left(\frac{W_2}{W_1}\right)$$

or $$-W_1 \log_e \left(\frac{W_1}{W_2}\right)$$

This voltage (which is commensurate with "effective fuel weight" for a constant velocity flight plan) is applied to excite potentiometer R–30, the wiper arm of which is positioned by the specific range servomotor M–1. Therefore, the voltage appearing on the wiper arm of potentiometer R–30 is proportional to the quantity $$\left[\frac{+VW_1}{\frac{dW_f}{dt}} \log_e \left(\frac{W_2}{W_1}\right)\right]$$

which equals $$\left[\frac{-VW_1}{\frac{dW_f}{dt}} \log_e \left(\frac{W_1}{W_2}\right)\right]$$

As explained above, this quantity is equivalent to the limit of aircraft range if a constant velocity flight plan is continued. This voltage equivalent to range is applied through summing resistor R-31 to servoamplifier U-7 to position range servomotor M-2 and range indicator I-R. Servomotor M-2 also positions the wiper arm of follow-up potentiometer R-32, to apply a follow-up voltage to servo amplifier U-7 through summing resistor R-33. Servomotor M-2 and rate tachometer generator G-2 function as in any conventional servo system, so that further description of their operation is believed to be unnecessary. Servomotor M-2 also positions range indicator I-R, as will now be apparent, to indicate range in miles if the pilot continues on the same flight plan.

The voltages from the wiper arms of potentiometers R-18 and R-19 are applied through contacts 19 and 16 respectively of selector switch S-1, and through summing resistors R-34 and R-40 respectively to the input terminal of summing amplifier U-8. As is explained above, the summation of these two voltages gives an output voltage proportional to the effective fuel weight quantity:

$$W_1 \log_e \frac{W_2}{W_1}$$

The voltage respresentative of that quantity is divided by the fuel flow rate $$\frac{dW_f}{dt}$$

by means of potentiometer R-35 and amplifier U-8 to give an output quantity proportional to:

$$\frac{W_1 \log_e \frac{W_2}{W_1}}{\frac{dW_f}{dt}}$$

or $$\frac{-W_1 \log_e \left(\frac{W_1}{W_2}\right)}{\frac{dW_f}{dt}}$$

That voltage, as explained above, is representative of aircraft endurance, and it is applied to servoamplifier U-9 to position the conventional servomechanism composed of servoamplifier U-9, servomotor M-3, rate tachometer generator G-3 and follow-up potentiometer R-36. The shaft position of servomotor M-3 will then determine the endurance indication, to indicate to the pilot the maximum time of flight remaining if he continues on the constant velocity flight plan. It will be apparent that meters may be substituted for the indicating servos M-1, M-2 and M-3.

Assuming that the pilot wishes instead to conduct a flight plan based on constant altitude, he will set computation selector switch S-1 to its center position. A voltage proportional to twice the instantaneous aircraft weight will be applied through contact 8 of switch S-1, and summing resistor R-27 to summing amplifier U-6. A voltage proportional to the quantity $$-2W_1 \sqrt{\frac{W_2}{W_1}}$$

will be applied through contact 11 of selector switch S-1 and summing resistor R-28 to summing amplifier U-6.

The output voltage appearing at terminal 20 will be the sum of the two input quantities, or the effective fuel weight quantity $$2W_1 - 2W_1 \sqrt{\frac{W_2}{W_1}}$$

The voltage at terminal 20 is utilized to excite potentiometer R-30, and since the wiper arm of potentiometer R-30 is operated by the "miles per pound" servomotor M-1, the quantity applied to potentiometer R-30 will be multiplied by a factor of $$\frac{V}{\frac{dW_f}{dt}}$$

which will cause a voltage to be applied through summing resistor R-31 commensurate with the quantity $$\frac{VW_1}{\frac{dW_f}{dt}} \left[2 - 2\sqrt{\frac{W_2}{W_1}}\right]$$

This latter quantity, as explained above, is commensurate with aircraft range for a constant altitude flight plan. The voltage applied through summing resistor R-31 will cause servomotor M-2 to be positioned in accordance with the applied input quantity, causing range indicator I-R to indicate to the pilot the number of additional miles he may go before reaching the aircraft final weight if he maintains the same altitude.

Since contacts 16 and 19 of selector switch S-1 are connected respectively to contacts 17 and 20, the same factors will be fed to summing amplifier U-8 as in computation under the first described flight plan, and endurance indicator I-E will indicate maximum time of flight remaining for a constant altitude cruise.

Whenever the weight of fuel remaining becomes small compared to aircraft weight, the pilot or other crew member operating the computer may switch computation selector switch S-1 to its lowermost position. If desired, switch S-1 may be mechanically or electrically connected to the aircraft fuel quantity measuring system by means of a cam or a switch, to move switch S-1 to its lowermost position automatically when a predetermined minimum amount of fuel remains in the tanks. With switch S-1 thusly positioned, the only voltage input quantity fed to summing amplifier U-6 will be the quantity $+W_f$ supplied through conductor 18, contact 15 of switch S-1 and summing resistor R-29. The negative of that quantity will appear at terminal 20, and thence be multiplied by "miles per pound" actuated potentiometer R-30 to provide a voltage commensurate with the quantity $$\frac{VW_f}{\frac{dW_f}{dt}}$$

to drive the range servo and indicator I-R.

A voltage proportional to fuel weight is also then supplied through conductor 18 to contact 18 of switch S-1 and resistor R-40 to amplifier U-8. Division of that voltage by fuel flow rate yields endurance. Hence the three indicators will then indicate specific range, range and endurance without taking into account the change in weight of aircraft fuel.

Although I have illustrated use of my computer in relation to "empty" weight of the aircraft, the final weight potentiometers may be adjusted to positions commensurate with any desired fraction of the aircraft fuel capacity. For example, if adjusted to one-half of the aircraft fuel quantity, the pilot would know how far he could fly on the same flight plan before turning back if he desired to return to his starting point.

My invention may also be used to predict the weight of the aircraft at a particular destination, which is an item which is very important for the pilot to know since it will govern his stalling speed when landing. In order to predict landing weight at destination, the computer operator need only turn the final weight control until the range indicator indicates the distance to the aircraft destination. The specific apparatus shown in FIG. 1 derives the instantaneous weight $W_1$ quantity by adding the $W_2 + W_f$, so in order to avoid inserting an erroneous $W_1$ quantity as the $W_2$ knob is turned, the operator should simultaneously adjust "Cargo Weight" potentiometer R-11 so as to maintain the original value of $W_1$ on indicator I-W. The dial of the final weight control will then indicate the aircraft weight at destination.

My invention may also be used to give a quick indication of time of arrival. By turning the final weight control until the range indicator indicates the distance to the destination, and simultaneously adjusting the "Cargo Weight" potentiometer R-11 to maintain constant instantaneous weight as mentioned above, the endurance indicator will indicate the time required to arrive at the destination if the same cruise plan is continued.

Referring to FIG. 2 there is shown a schematic diagram of an assembly by which the wiper arms of potentiometers R-35 and R-52 may be positioned to a position representative of fuel flow rate. Positioned within fuel line conduit 60 is propeller 61, which rotates at a speed proportionate to the rate of fuel flow through conduit 60. Rotation of propeller 61 is transmitted through shaft 62, bevel gears 64 and 63, and shaft 65 to rotate magnet 66. Magnet 66 is disposed within hollow aluminum cylinder 67, which is rotatably mounted at one end by means of shaft 68 in bearing block 69. Affixed to cylinder 67 is spring 70, which restrains rotation of cylinder 67. Magnet 66 and cylinder 67 together constitute a conventional eddy current drag cup, and as will be recognized by those skilled in the art, the torque tending to rotate cylinder 67 and shaft 68 will be proportional to the speed of rotation of magnet 66. Connected to the other end of shaft 68 are the shafts of a plurality of potentiometers. While I have shown but two potentiometer shafts connected to be rotated by shaft 68, it will be apparent that additional potentiometer shafts may be connected in a similar manner. Since the position of the shafts of potentiometers R-52 and R-35 is proportional to the torque imparted to eddy current drag cup cylinder 67, and because such torque is proportional to the speed of rotation of propeller 61, it will be apparent that the wiper arms connected to the shafts of potentiometers R-52 and R-35 are positioned in accordance with fuel flow-rate. Connections are shown for each of potentiometers R-35 and R-52. Each of the center terminals is connected to the wiper arm of its respective potentiometer.

In the event that my invention is to be used in connection with a multi-engine aircraft having separate rate of flow systems for each engine, it will be apparent that additional assemblies similar to that shown in FIG. 2 will be required. In such a case, the voltage applied to summing resistor R-53 should be combined with the voltages supplied from the counterparts of resistor R-53 in the other assemblies in a summing amplifier, and the output of the summing amplifier could then be applied to the input of summing amplifier U-4 (see FIG. 1). Similarly, the voltage applied to summing resistor R-37 would be summed with the voltage or voltages from counterparts of resistor R-37 in the other assemblies, and the output then supplied to summing amplifier U-8. Additional summing amplifiers may be furnished at the output of summing amplifiers U-4 and U-8 in order to correct the 180 degree phase inversion caused by the rate of fuel flow summing amplifiers.

At any time during a cruise, the computer operator may move selector switch S-1 alternately to its various positions. The indications on the indicators will then inform him of the relative advantages and disadvantages of the various flight plans.

Referring to FIG. 3 there is shown one of numerous means which may be employed to derive a voltage proportional to aircraft ground speed for application to terminal 50 in FIG. 1. Alternating voltage is applied at terminal 10 from the computer power supply to excite potentiometer R-70. The wiper arm of potentiometer R-70 is positioned by the computer operator in accordance with the prevailing wind velocity. The output voltage appearing upon the wiper arm of potentiometer R-70, is proportional to wind velocity and is applied through summing resistor R-71 to summing amplifier U-11. The output voltage from the summing amplifier U-11 is used to excite winding S, the stator winding of electromagnetic resolver T-2. The rotor of resolver T-2 is positioned by the operator of the computer manually to a position commensurate with wind direction relative to magnetic north. The sine function output of resolver T-2, proportional to northerly component of wind, is applied through summing resistor R-72 to summing amplifier U-12. The cosine output of resolver T-2, proportional to easterly component of wind, is applied through summing resistor R-73 to summing amplifier U-13. The output voltages of summing amplifiers U-12 and U-13 are applied to excite the windings of the stator of resolver T-3. The rotor of resolver T-3 is positioned to magnetic heading, either manually by the computer operator, or by being connected to the aircraft direction indicating system. The output from resolver cosine coil 70 is applied through summing resistor R-74 to summing amplifier U-14. It will be apparent that this voltage applied through summing resistor R-74 is equal to the product of wind intensity multiplied by a wind direction factor, and further multiplied by a factor of aircraft magnetic heading, and hence will be proportional to the component of wind which acts along the axis of the aircraft through its nose and tail. The output voltage from sine coil 71 of resolver T-3 is applied through summing resistor R-75 to summing amplifier U-15. It will be apparent that this latter voltage will be representative of forces 90 degrees displaced from those represented by the output voltage of coil 70, and hence the voltage applied to summing resistor R-75 is proportional to the component of wind velocity along the lateral axis of the aircraft, from wing tip to wing tip.

Also applied to the input circuit of summing amplifier U-14 is a voltage proportional to true air speed, which is routed from true air speed computer COMP-1 through summing resistor R-77. Since true air speed computers are well known in the art, and since this portion of the disclosure is not part of my invention, a detailed description of its operation is deemed unnecessary.

It will be apparent, then, that the output voltage from summing amplifier U-14 will be the sum of the true air speed of the plane in the direction of its heading plus the component of wind velocity along the aircraft heading path.

The voltage outputs from summing amplifiers U-14 and U-15 are applied to excite the stator coils of resolver T-4. The stator excitation of resolver T-4 is therefore representative of magnitude and direction of velocities on the aircraft with respect to aircraft heading. The output voltage from sine winding 72 of the rotor of resolver T-4 is applied through resistor R-76 to drive servo amplifier U-16.

Servo amplifier U-16 furnishes excitaton to servomotor M-4, the shaft of which positions the rotor of resolver T-4. Since a servo will position itself so as to minimize or null out its input signal, sine winding of resolver T-4 will be driven until it is perpendicular to the resultant flux of the stator windings of resolver T-4. Because the stator resultant flux represents aircraft heading, the sine winding 72 will have been turned an amount equal to the 'crab angle" of the aircraft, which is the angle between flight path and heading.

Cosine winding 73 of resolver T-4 will then have an output voltage at its terminal 50 proportional to aircraft heading as modified by the cosine of the angle between aircraft flight path and aircraft heading. The output voltage is proportional to the ground speed of the aircraft along its flight path. This voltage is routed to terminal 50 for use as described in connection with FIG. 1.

Referring to FIG. 4, there is shown an additional and much simpler method of supplying a voltage proportional to aircraft ground speed to terminal 50. Terminal 10 is connected to the aircraft alternating voltage supply, and hence potentiometer R-77 is excited by the computer voltage supply. The operator of the computer may then position the wiper arm of potentiometer R-77 in accordance with ground speed as calculated with a conventional slide rule type flight calculator, or as calculated from observation of known objects on a radar scope.

It will thus be seen that the objects set forth above, among those made apparent from the preceding description, are efficiently attained, and since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention, which as a matter of language, might be said to fall therebetween.

What I claim as new and desire to secure by Letters Patent is:

1. Aircraft range computation apparatus comprising aircraft speed-measuring means and aircraft fuel flow rate measuring means connected to derive computer quantities commensurate with aircraft speed and fuel flow rate, computer division means connected to receive said computer quantities and operable to produce a first computed quantity commensurate with instantaneous aircraft specific range, means for deriving second and third potentials commensurate respectively to aircraft final weight and aircraft instantaneous fuel weight, means for combining said second and third potentials in accordance with a desired flight plan to provide a fourth potential commensurate with aircraft effective fuel weight, means for modifying said fourth potential in accordance with said first computed quantity to provide an output potential commensurate with maximum aircraft range as the selected flight plan is continued, and indicating means responsive to said output potential.

2. Aircraft endurance computation apparatus comprising means for deriving a computer quantity commensurate with instantaneous aircraft fuel flow rate, means for deriving first and second potentials commensurate respectively to aircraft final weight and aircraft instantaneous fuel weight, means for combining certain functions of said first and second potentials in accordance with the selection of one of a plurality of predetermined flight plans to provide a third potential commensurate with instantaneous aircraft effective fuel weight, and means for producing an output indication commensurate with the ratio between said fuel flow rate computer quantity and said third potential.

3. Aircraft range computation apparatus comprising means for deriving a first potential commensurate with aircraft fixed weight, potentiometer means actuated by an aircraft fuel gage to derive a second potential commensurate with instantaneous fuel weight, summing means connected to said first and second potentials to produce a third potential commensurate with total instantaneous aircraft weight, circuit means connected to combine selected functions of said first and third potentials to provide a fourth potential proportional to the logarithm of the ratio between said first and third potentials modified by said third potential, modifying means responsive to aircraft fuel flow rate for modifying said fourth potential, and aircraft performance indicating means connected to said modified fourth potential.

4. Apparatus as in claim 3 in which said modifying means is responsive to the ratio between aircraft speed and fuel flow rate to modify said fourth potential in accordance with aircraft specific range, and in which said performance indicating means comprises range indicating apparatus.

5. Aircraft range computation apparatus comprising means for deriving a first potential commensurate with a fixed component of aircraft weight, potentiometer means actuated in accordance with instantaneous aircraft fuel weight to produce a second potential commensurate therewith, summing means connected to combine said potentials to provide a third potential, switching means positionable in accordance with a desired flight plan to apply predetermined functions of said first and third potentials to a summing means to provide a fourth potential commensurate with effective fuel weight, said effective fuel weight being a function of the ratio determined by the instantaneous aircraft fuel weight and said fixed component of aircraft weight, means for modifying said fourth potential in accordance with fuel flow rate to provide an output potential, and indicating means responsive to said output potential.

6. Aircraft performance computing apparatus comprising means for deriving a first computer quantity commensurate with aircraft empty weight, means for deriving a first potential commensurate with aircraft fuel weight, means for combining said computer quantity and first potential to provide a second potential commensurate with total aircraft instantaneous weight, switch means operable in accordance with a selected flight plan to apply at least two of said potentials to a summing means to provide a third potential which varies in accordance with a selected ratio between said first computer quantity and said second potential, said ratio being selected in accordance with the adjustment of said switch means, and means for modifying said third potential in accordance with aircraft fuel flow rate to provide an output potential commensurate with aircraft endurance.

7. Aircraft performance computer apparatus comprising in combination means for deriving a first potential commensurate with aircraft instantaneous weight, means for modifying said first potential in accordance with aircraft final weight and aircraft instantaneous weight to provide a second potential commensurate with the square root of the ratio between aircraft final weight and aircraft instantaneous weight, means for combining said first and second potentials to provide a third potential commensurate with effective fuel weight, means for modifying said third potential in accordance with aircraft instantaneous specific range to provide an output potential, and indicating means responsive to said output potential to provide an output indication of aircraft range under a constant altitude flight plan.

8. Aircraft range computing apparatus comprising in combination means for deriving a first computer quantity commensurate with aircraft instantaneous weight $W_1$, means for deriving a second computer quantity commensurate with aircraft empty weight $W_2$, means for deriving a third computer quantity commensurate with aircraft instantaneous specific range $$\frac{V}{\frac{dW_f}{dt}}$$

circuit means combining said quantities to provide an output quantity commensurate with $$\frac{W_1 V}{\frac{dW_f}{dt}} \log_e \frac{W_1}{W_2}$$

and output means responsive to said output quantity.

9. Aircraft range computing apparatus comprising in combination means for deriving a first computer quantity commensurate with aircraft instantaneous weight $W_1$, means for deriving a second computer quantity commensurate with aircraft empty weight $W_2$, means for deriving a third computer quantity commensurate with aircraft instantaneous specific range $$\frac{V}{\frac{dW_f}{dt}}$$

circuit means combining said quantities to provide an output quantity commensurate with $$\frac{W_1 V}{\frac{dW_f}{dt}}\left[2 - 2\sqrt{\frac{W_2}{W_1}}\right]$$

and output means responsive to said output quantity.

10. Aircraft endurance computing apparatus comprising in combination means for deriving a first computer quantity commensurate with aircraft instantaneous weight $W_1$, means for deriving a second computer quantity commensurate with aircraft empty weight $W_2$, means for deriving a third computer quantity commensurate with aircraft instantaneous fuel flow rate $$\frac{dW_f}{dt}$$

circuit means combining said quantities to provide an output quantity commensurate with $$\frac{W_1}{\frac{dW_f}{dt}} \log_e \left(\frac{W_1}{W_2}\right)$$

and output means responsive to said output quantity.

11. Apparatus according to claim 10 having further means for deriving a fourth computer quantity commensurate with aircraft instantaneous fuel weight $W_f$ and in which said circuit means may be switched to provide an alternative output quantity $$\frac{W_f}{\frac{dW_f}{dt}}$$

12. Aircraft weight-at-destination computing apparatus comprising first and second adjustable means for deriving first and second computer quantities commensurate with first and second components of aircraft weight, means for deriving a third computer quantity commensurate with instantaneous aircraft fuel weight, means for combining said quantities to provide a first potential, a first indicator responsive to said potential, circuit means for combining selected functions of said first and third quantities to provide an effective fuel weight potential, means for modifying said effective fuel weight potential in accordance with instantaneous specific range to provide a computer output quantity commensurate with aircraft range under a selected flight plan, a second indicator responsive to said output quantity, whereby adjustment of said adjustable means until said second indicator indicates a desired range causes the first of said adjustable means to indicate weight-at-destination if the selected flight plan is followed, the second of said adjustable means being adjusted simultaneously to maintain constant said first potential.

13. Apparatus according to claim 12 having means for modifying said effective fuel weight potential in accordance with instantaneous rate of fuel flow to provide an endurance potential, and a time-of-flight indicator responsive to said endurance potential.

References Cited in the file of this patent

UNITED STATES PATENTS

| | | |
|---|---|---|
| 2,595,185 | Zauderet et al. | Apr. 29, 1952 |
| 2,614,422 | Payne | Oct. 21, 1952 |
| 2,656,977 | Cummings | Oct. 27, 1953 |
| 2,714,309 | Redemske | Aug. 2, 1955 |
| 2,783,940 | Hartman | Mar. 5, 1957 |